United States Patent
Schubert et al.

(10) Patent No.: US 7,269,483 B2
(45) Date of Patent: Sep. 11, 2007

(54) MULTIPLE ALGORITHM EVENT DISCRIMINATION METHOD

(75) Inventors: Peter J. Schubert, Carmel, IN (US); Chad M. Aeschliman, Ossian, IN (US); Benjamin C. Wiles, W. Lafayette, IN (US)

(73) Assignee: Delphi Technologies, Inc., Troy, MI (US)

( * ) Notice: Subject to any disclaimer, the term of this patent is extended or adjusted under 35 U.S.C. 154(b) by 407 days.

(21) Appl. No.: 10/921,722

(22) Filed: Aug. 19, 2004

(65) Prior Publication Data

US 2006/0041336 A1 Feb. 23, 2006

(51) Int. Cl.
*B60R 21/00* (2006.01)
*G06F 17/00* (2006.01)
(52) U.S. Cl. ............................ 701/1; 701/38; 701/45; 180/271; 280/756
(58) Field of Classification Search ................ 701/1, 701/38, 45; 180/271, 282; 280/756, 728.1, 280/5.502; 340/440
See application file for complete search history.

(56) References Cited

U.S. PATENT DOCUMENTS

| | | | | |
|---|---|---|---|---|
| 5,262,949 | A * | 11/1993 | Okano et al. ................. | 701/46 |
| 5,550,751 | A | 8/1996 | Russell | |
| 5,583,771 | A * | 12/1996 | Lynch et al. ................... | 701/36 |
| 6,186,539 | B1 * | 2/2001 | Foo et al. .................... | 280/735 |
| 6,421,592 | B1 | 7/2002 | Bargman et al. | |
| 6,529,811 | B2 * | 3/2003 | Watson et al. ................. | 701/45 |
| 6,981,565 | B2 * | 1/2006 | Gleacher .................... | 180/282 |
| 2003/0093201 | A1 | 5/2003 | Schubert et al. | |
| 2004/0036261 | A1 * | 2/2004 | Breed ......................... | 280/735 |
| 2005/0060069 | A1 * | 3/2005 | Breed et al. .................. | 701/29 |
| 2005/0261818 | A1 * | 11/2005 | Brown et al. ................. | 701/70 |

FOREIGN PATENT DOCUMENTS

EP 1 552 987 7/2005

OTHER PUBLICATIONS

Bogler, P.L., "Shafer-Dempster Reasoning with Applicationsto Multisensor Target Identification Systems", IEEE Trans.Sys.Man Cyber., vol. SMC-17, No. 6, Nov./Dec. 1987, pp. 968-977.
Bolc, L., "Many-Valued Logics", 1, Springer Verlag, 1992.
Klein, L.A., "A Boolean Algebra Approach to Multiple Sensor Voting Fusion", IEEE Trans. Aerospace and Electronic Sys., vol. 29, No. 2, Apr. 1993, pp. 317-327.
Lucas, C, "Generalization of the Dempster-Shafter Theory: A Fuzzyy-Valued Measure", IEEE Trans. Fuzzy Sys., vol. 7, No. 3, Jun. 1999.
Malinowski, G., "Many-Valued Logics", Clarendon Press, Oxford, 1993.
Pearl, J., "Probabilistic Reasoning in Intelligent Systems: Networks of Plausible Inference", Morgan Kaufmann, 1998.
Shafer, G., "A Mathematical Theory of Evidence", Princeton University Press, 1976.
Shafer, G., "Uncertain Reasoning", Morgan Kaufmann, 1990.
European Search Report dated Mar. 22, 2006.

* cited by examiner

*Primary Examiner*—Tan Q. Nguyen
(74) *Attorney, Agent, or Firm*—Jimmy L. Funke

(57) ABSTRACT

An event discrimination methodology executes multiple versions of the same or different event discrimination algorithms and logically or arithmetically combines their outputs to distinguish between specified events and non-events. One given algorithm is repeatedly executed with different sets of calibration data, or alternately, a number of different algorithms are executed. In cases where the algorithm results are arithmetically combined, the weights accorded to each algorithm result are dynamically adjusted based on driver input or vehicle dynamic behavior data to accord highest weight to the algorithm(s) calibrated to identify events associated with the detected driver input or vehicle dynamic behavior.

7 Claims, 3 Drawing Sheets

| EVENT | DEPLOYMENT LATENESS (ms) | | |
|---|---|---|---|
| | CAL 1 | CAL 2 | CAL 3 |
| A | 110 | 180 | - 250 |
| B | 30 | - 180 | - 200 |
| C | 124 | - 96 | 124 |
| D | 10 | - 70 | 330 |
| E | - 70 | - 80 | - 60 |
| F | 10 | - 20 | 430 |

| EVENT | DEPLOYMENT LATENESS (ms) | | |
|---|---|---|---|
| | CAL 1 | CAL 2 | CAL 3 |
| A | 110 | 180 | -250 |
| B | 30 | -180 | -200 |
| C | 124 | -96 | 124 |
| D | 10 | -70 | 330 |
| E | -70 | -80 | -60 |
| F | 10 | -20 | 430 |

FIG. 4

MULTIPLE ALGORITHM EVENT DISCRIMINATION METHOD

TECHNICAL FIELD

The present invention relates to event discrimination algorithms, and more particularly to a method of using multiple algorithms and/or calibration sets to achieve early event discrimination.

BACKGROUND OF THE INVENTION

Event discrimination algorithms are widely used to detect the occurrence of a specified condition or event that is not susceptible to direct measurement. For example, a restraint deployment algorithm in a motor vehicle is designed to detect the occurrence of a crash event severe enough to warrant deployment of passenger restraints based on measured acceleration data and the like, while discriminating against events that are not sufficiently severe to warrant deployment of the passenger restraints. Other automotive examples include algorithms for detecting an impending rollover event, and algorithms for discriminating between frontal impacts and side impacts.

In general, event discrimination algorithms are developed by analyzing various sets of data measured during both events and non-events, and recognizing data patterns that can be used to discriminate between events and non-events. For example, the U.S. Pat. No. 6,542,792 to Schubert et al. discloses a rollover detection algorithm in which an operating point of the vehicle defined by its roll rate and roll angle is compared with a calibrated threshold that divides the roll rate vs. roll angle space into rollover events and non-rollover events. While calibrating an algorithm to reliably discriminate a specified event for any one data set is not difficult, calibrating the algorithm to reliably discriminate a specified event for multiple data sets can be very difficult. For example, suppose input data sets for three deploy events A, B, C and three non-deploy events 1, 2, 3 are available. In principle, the event discrimination algorithm must be calibrated to distinguish events A-C vs. events 1-3. If a new input data set for deploy event D becomes available and the algorithm fails to correctly identify D as a deploy event, the algorithm must be re-calibrated to distinguish events A-D vs. events 1-3. It will be appreciated that this can be an extremely difficult and time consuming procedure, possibly requiring re-evaluation of the algorithm framework in addition to re-calibrating various algorithm thresholds. Accordingly, what is needed is a more effective way of adapting an event discrimination algorithm to both current and future input data sets without sacrificing discrimination reliability or delaying detection of the specified event.

SUMMARY OF THE INVENTION

The present invention is directed to an improved method of using an event discrimination algorithms to distinguish between specified events and non-events, where multiple sets of the same or different algorithms are executed, and the results are logically or arithmetically combined to produce a single output that distinguishes between the specified events and non-events. In one embodiment, one given algorithm is repeatedly executed with different sets of calibration data; in another embodiment, a number of different algorithms are executed. In embodiments where the algorithm results are arithmetically combined, the weights accorded to each algorithm result are dynamically adjusted based on driver input or vehicle dynamic behavior data.

BRIEF DESCRIPTION OF THE DRAWINGS

FIG. 4 is a table depicting the operation of the invention in an embodiment where a single algorithm is executed with three different calibration sets.

DESCRIPTION OF THE PREFERRED EMBODIMENT

The method of the present invention is disclosed in the context of an event discrimination system designed to detect an impending rollover condition of a vehicle. However, it should be recognized that the method equally applies to other event discrimination systems, both automotive and non-automotive.

Figure 1:
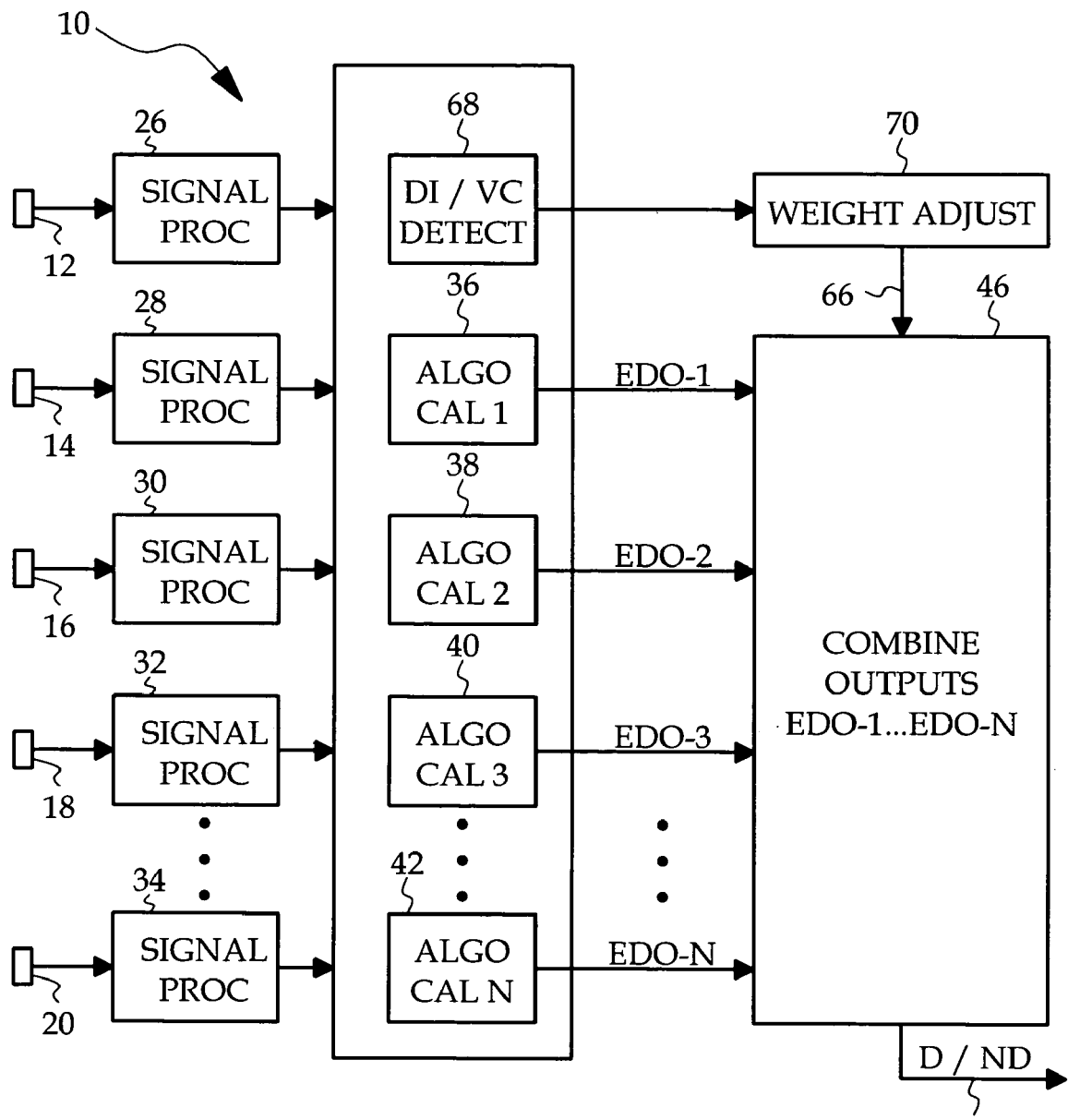
FIG. 1 is a block diagram of an event discrimination system according to this invention.

Referring to the drawings, and particularly to FIG. 1, the reference numeral 10 generally designates a diagram of a vehicle rollover detection system for implementing the methodology of the present invention. The methodology is carried out by an on-board microprocessor-based control unit such as a supplemental restraint controller that selectively activates various rollover restraint devices such as air bags, side curtains, seat belt pretensioners and pop-up roll bars. The inputs include the data developed by various sensors 12, 14, 16, 18, 20, and the output is a Deploy/No-Deploy (D/ND) command on line 22. The sensor data pertinent to rollover detection may include for example, vehicle speed, wheel speeds, roll rate, lateral acceleration, vertical acceleration, yaw rate, steering wheel position, tire pressure, and so on. The input data is subjected to conventional signal processing (low-pass filtering, for example) as indicated by the blocks 26, 28, 30, 32, 34 if not already processed, and made available for use by one or more event detection algorithms, as represented by the blocks 36, 38, 40, 42. Each block produces an event discrimination output (EDO-1, EDO-2, EDO-3, EDO-N), and the block 46 combines the outputs to produce the single deploy/no-deploy (D/ND) output on line 22.

In a preferred implementation of the invention, the algorithms represented by the blocks 36-42 are the same rollover detection algorithm, but differently calibrated. For example, block 36 can represent a copy of the algorithm that is calibrated to reliably discriminate between rollover and non-rollover events associated with sudden braking and erratic movement of the vehicle steering wheel, block 38 can represent a copy of the algorithm that is calibrated to reliably discriminate between rollover and non-rollover events associated with side impacts, and so on. This approach works best with an algorithm having a high degree of calibration flexibility; one example of such an algorithm in the field of rollover detection is the algorithm disclosed in the U.S. Pat. No. 6,421,592, incorporated herein by reference.

Alternatively, the algorithms represented by the blocks 36-42 can be different special-purpose algorithms, each designed to reliably distinguish between rollover events and non-rollover events associated with a specified kind of driver input or vehicle operating condition. For example, some algorithms are very good at discriminating rollover events associated with erratic driver steering inputs, while other algorithms are very good at discriminating rollover events associated with side impacts, and so on.

Figure 2:
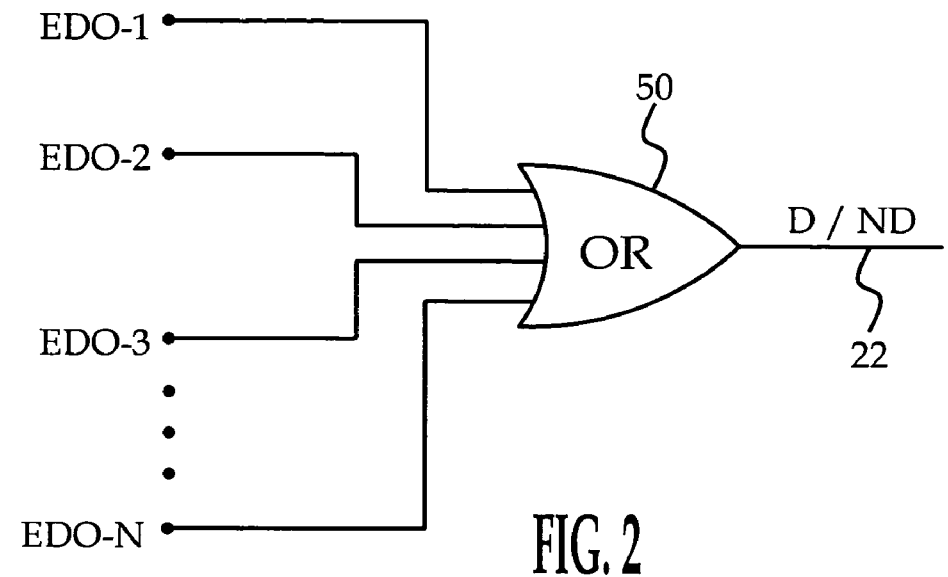
FIG. 2 is a block diagram illustrating a method of logically combining multiple event discrimination outputs according to this invention.
Figure 3:
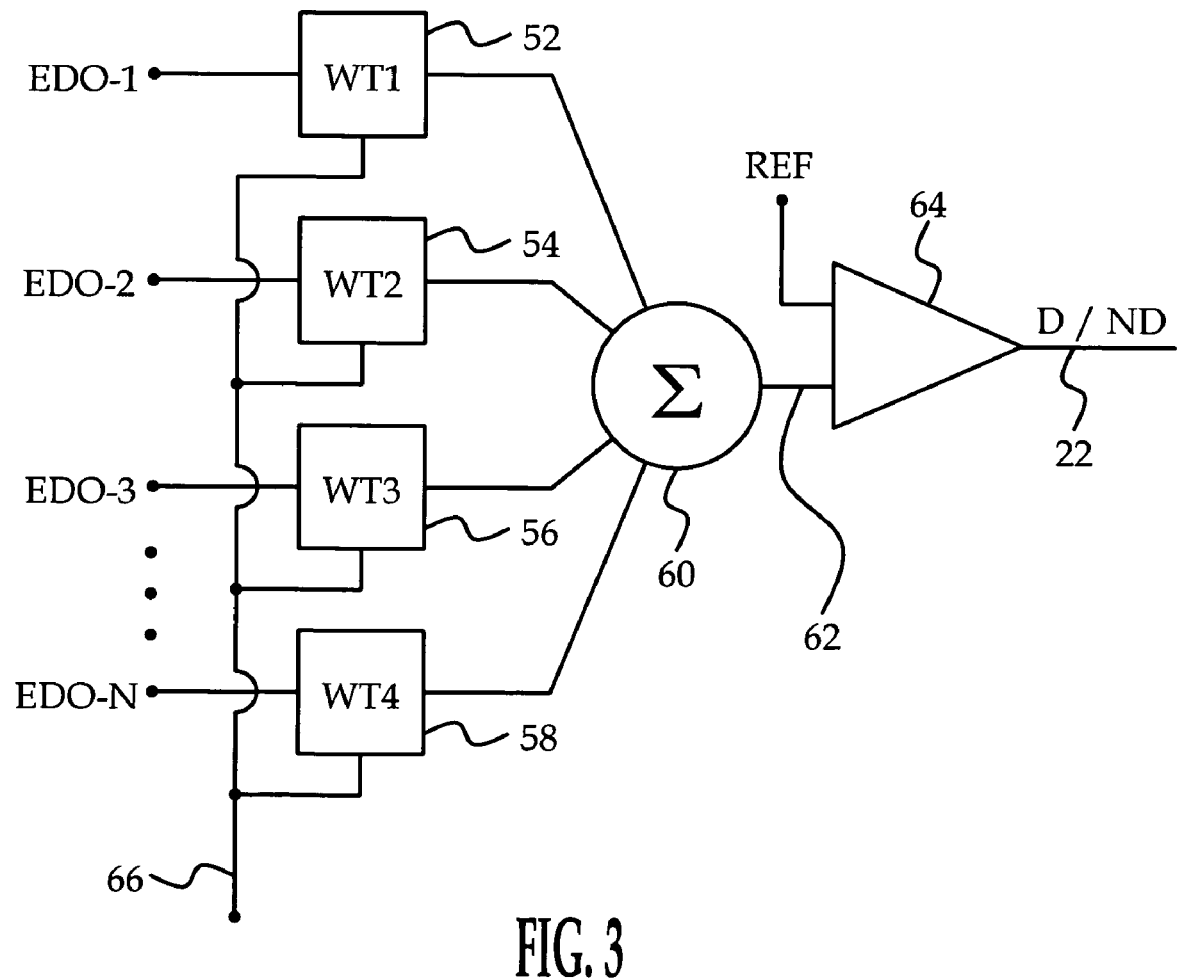
FIG. 3 is a block diagram illustrating a method of arithmetically combining multiple event discrimination outputs according to this invention.

FIGS. 2 and 3 illustrate two different ways the event discrimination outputs EDO-1-EDO-N can be combined by the block 46. The simplest approach, illustrated in FIG. 2, is to logically combine the outputs using a Boolean-OR function as indicated by the block 50. If any of the event discrimination outputs EDO-1-EDO-N indicates the presence of an impending rollover event, the OR block 50 produces a Deploy command on D/ND output line 22; otherwise the result is a No-Deploy command. FIG. 3 illustrates a somewhat different approach in which the outputs are arithmetically combined. The outputs are individually weighted by the blocks 52, 54, 56, 58 and summed by the block 60 to form a combined output on line 62. The combined output on line 62 is compared with a reference value REF by the comparator 64 to produce the D/ND output on line 22. While the weights applied to each algorithm can be equal, they are preferably adjustable on-the-fly (by the control line 66, for example) based on an assessment of driver inputs and/or vehicle operating conditions so that higher weight can be accorded to an algorithm designed to detect rollover events associated with the current conditions. In the diagram of FIG. 1, the block 68 has access to the input data from sensors 12-20 and carries out the function of assessing of driver inputs and/or vehicle operating conditions. When a specified input or condition (such as a side impact) is detected, the block 68 signals the weight-setting block 70 to re-distribute the weights applied by blocks 52-58 so that the output(s) of the algorithm(s) calibrated to discriminate rollover events associated with the detected condition is given more weight than algorithms calibrated to discriminate rollover events associated with different conditions.

FIG. 4 illustrates the performance of a rollover detection system configured according to the method of the present invention, as applied to six different data sets for rollover events A-F. In the illustration, three different copies of the same highly flexible rollover detection algorithm are individually calibrated and separately executed for each event A-F. The algorithm designated as CAL1 is calibrated to provide correct if not timely rollover discrimination for all of the events A-F. The algorithm designated as CAL2 is specifically calibrated to provide reliable detection of fast rollover events, due for example, to curb trips; and the algorithm designated as CAL3 is specifically calibrated to provide reliable detection of slow rollover events, due for example, to straying into a roadside ditch. A desired deployment time is specified for each of the events A-F, and the table of FIG. 4 indicates the lateness of the deploy command relative to the desired time; a positive number indicates a deployment command that is late (which is undesirable), while a negative number indicates a deployment command that is early (which is desirable). While each of the algorithms correctly identifies the events A-F as rollover events, it is apparent that one or more of the algorithms are able to better discriminate any given event better than the other algorithms. For example, the algorithm designated as CAL1 adequately discriminates rollover events B, D, E and F, but fails to adequately discriminate events A and C. The algorithm designated as CAL2 adequately discriminates rollover events B-F, but fails to adequately discriminate event A. And the algorithm designated as CAL3 adequately discriminates rollover events A, B and E, but fails to adequately discriminate events C, D and F. While no single calibration of the algorithm can timely discriminate all of the rollover events, at least one version of the algorithm can timely discriminate any given event. When the outputs are logically or arithmetically combined according to this invention, the output of the algorithm designated as CAL3 triggers a deployment command for events A and B; and the output of the algorithm designated as CAL2 triggers a deployment command for events C, D, E and F. If an additional set of rollover event data becomes available and the currently configured system fails to correctly discriminate the event, the only change required to achieve correct discrimination for all known events is to calibrate an additional version of the algorithm for the new event, and logically or arithmetically combine its output with the outputs of the existing versions of the algorithm. Of course, this same advantage occurs in embodiments comprising a number of different algorithms instead of different versions of the same algorithm. Since each of the algorithms is designed to detect a certain class of rollover events while discriminating against all non-rollover events in general, the logical or arithmetic combination of all algorithm outputs will also identify all rollover events while discriminating against all non-rollover events.

The number of algorithm versions or different algorithms that can be executed according to this invention on any given system depends only on the memory and throughput capabilities of the system. In practice, the system microprocessor can call the algorithm(s) as a function with different calibrations passed to it as an argument. For example, assume a system with sensors running at a 10 Oms sampling rate. Between samples, a main program executed by the microprocessor would pass the sensor data along with each set of calibrations to the algorithm(s), which would return a signal to the main program indicating whether or not to deploy. If at any time a deploy is returned, the main program would initiate the issue a deploy command. Otherwise, after 10 Oms the next set of sensor data would be received and the process would start over again. The only limitation on the number of calibrations would be the speed of the processor, since all of the sets need to be run in the 10 Oms interval between sensor data packets. Also, if functions defining the relationship between the variables for several calibrations of an algorithm can be found, the algorithm can change its own calibration during operation. For example, one variable can be varied over tens or hundreds of values and the other values calculated.

While the method of the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of discriminating an occurrence of a specified event in a system based on measured or estimated system parameter data pertinent to said event, the method comprising the steps of:

developing a plurality of different calibrations for one event discrimination algorithm for detecting said different patterns of parameter data that are characteristic of the occurrence of said specified event;

successively executing said one event discrimination algorithm with said different calibrations to produce a plurality of event discrimination outputs; and combining said plurality of event discrimination outputs to form a single output that discriminates the occurrence of said specified event.

2. The method of claim 1, wherein the step of combining said event discrimination outputs includes the step of:
   combining said event discrimination outputs with a logical-OR function.

3. A method of discriminating an occurrence of a specified event in a system based on measured or estimated system parameter data pertinent to said event, the method comprising the steps of:
   executing a number of event discrimination algorithms individually calibrated to detect different patterns of parameter data that are characteristic of the occurrence of said specified event, each algorithm producing an event discrimination output;
   applying calibrated weights to each of said event discrimination outputs;
   combining the weighted event discrimination outputs to form a combined output; and
   forming a single output based on said combined output.

4. The method of claim 3, where said different patterns of parameter data are characteristic of occurrences of said specified event due to different dynamic conditions of said system, and the method includes the steps of:
   monitoring system data to detect at least one of said different dynamic conditions of said system;
   identifying one or more of the event discrimination algorithms that are calibrated to detect a pattern of parameter data that is characteristic of occurrences of said specified event due to the detected dynamic condition; and
   according higher weight to the event discrimination output of the identified event discrimination algorithm when combining the event discrimination outputs produced by said algorithms.

5. The method of claim 4, including the steps of:
   storing a set of calibrated weights to be applied to each of said event discrimination outputs for arithmetically combining said event discrimination outputs; and
   adjusting said calibrated weights in response to detection of said at least one the different dynamic condition of said system so as to increase the weight applied to the event discrimination output of the identified event discrimination algorithm.

6. The method of claim 3, where the specified event is a rollover of a vehicle operated by a driver, and said different patterns of parameter data are characteristic of occurrences of said specified event due to different actions of said driver, the method including the steps of:
   monitoring system data to detect at least one of said different actions of said driver;
   identifying one or more of the event discrimination algorithms that are calibrated to detect a pattern of parameter data that is characteristic of occurrences of said specified event due to the at least one detected action of the driver; and
   according higher weight to the event discrimination output of the identified event discrimination algorithm when combining the event discrimination outputs produced by said algorithm.

7. The method of claim 6, including the steps of:
   storing a set of calibrated weights to be applied to each of said event discrimination outputs for arithmetically combining said event discrimination outputs; and
adjusting said calibrated weights in response to detection of said at least one action of said driver so as to increase the weight applied to the event discrimination output of the identified event discrimination algorithm.

* * * * *